April 7, 1925.  1,532,658
J. E. HALE
VALVE STEM FOR PNEUMATIC TIRES AND ACCOMMODATING WHEEL RIM THEREFOR
Filed June 21, 1919   2 Sheets-Sheet 1
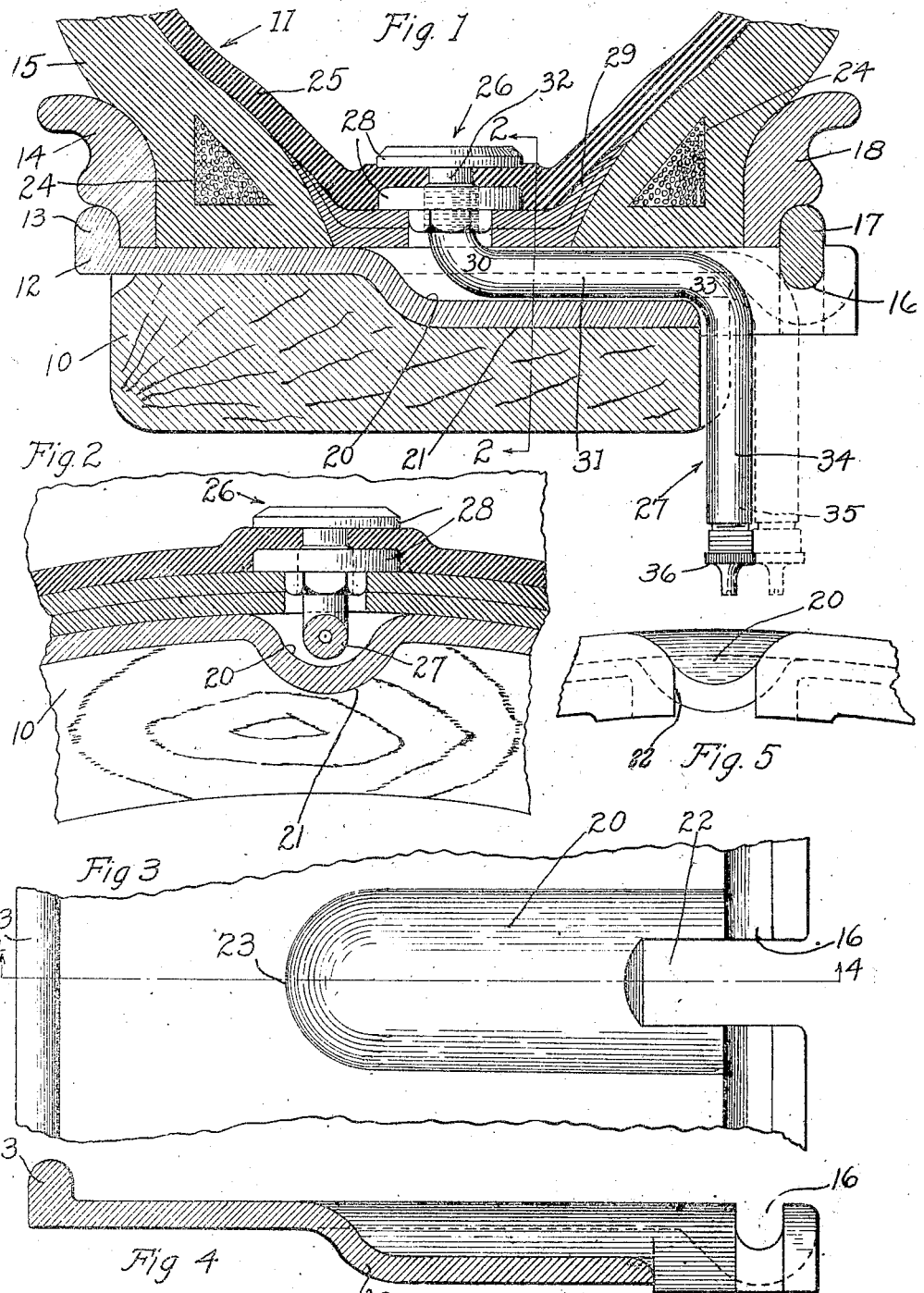
Inventor
James E. Hale

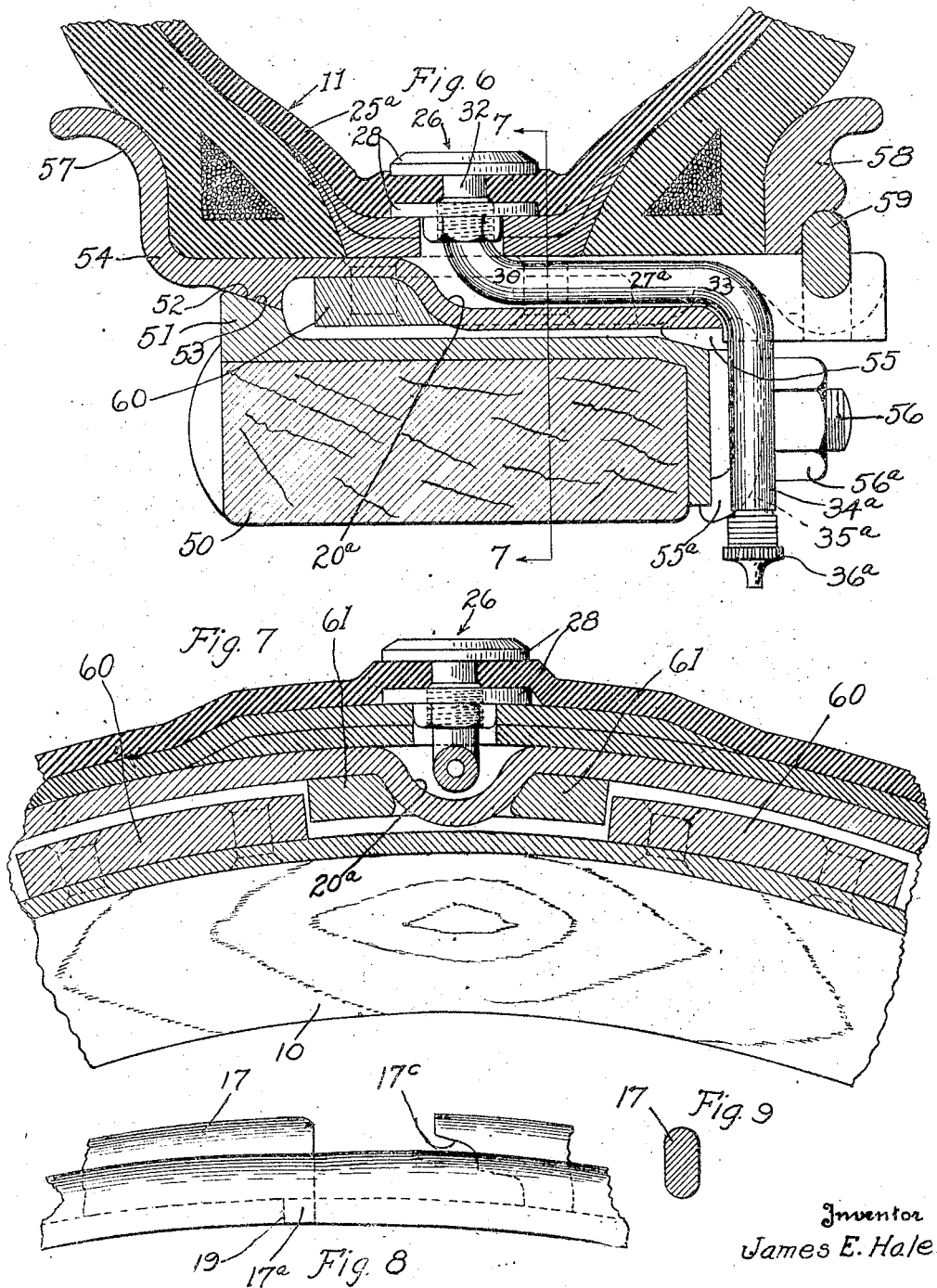

Patented Apr. 7, 1925.

1,532,658

UNITED STATES PATENT OFFICE.

JAMES E. HALE, OF AKRON, OHIO, ASSIGNOR TO THE GOODYEAR TIRE & RUBBER COMPANY, OF AKRON, OHIO, A CORPORATION OF OHIO.

VALVE STEM FOR PNEUMATIC TIRES AND ACCOMMODATING WHEEL RIM THEREFOR.

Application filed June 21, 1919. Serial No. 305,828.

*To all whom it may concern:*

Be it known that I, JAMES E. HALE, a citizen of the United States, and resident of Akron, Ohio, have invented new and useful Improvements in Valve Stems for Pneumatic Tires and Accommodating Wheel Rim Therefor, of which the following is a specification.

My invention relates broadly to a new and useful means whereby pneumatic tires may be easily mounted on and as easily removed from wheel rims; and it has particular reference to a valve stem so shaped as to insure this facility of mounting and demounting tires, and to a cooperating rim accommodating the valve stem.

It is well recognized by those familiar with the use of pneumatic tires on vehicle wheels, and especially by those whose work involves the mounting and demounting of heavy pneumatic truck tires, the weights of of which vary from 80 to 300 pounds, that those operations are usually performed only with the greatest difficulty, requiring as they do, not only a high degree of skill, but great strength and exertion as well.

In practice, hitherto, it has been difficult, where the rim has been provided with a receiving aperture for the valve stem, to manipulate these ponderous tires to bring the valve stem in register with the aperture, in mounting the tires, and when the tires were being demounted great difficulty has also arisen in pressing the valve stem down into the aperture and in turning the tire back and forth to finally pull it off the wheel, for not infrequently the parts stick from rust or otherwise, and it becomes almost impossible to sufficiently flex the stem.

Furthermore, the felloes of wheels on which such tires are mounted are of various thicknesses, necessitating the use of valve stems of various lengths, which makes it almost essential that dealers should keep on hand a supply of inner tubes having valve stems of different lengths.

Further, the use of straight valve stems has frequently rendered them inaccessible for the purpose of inflating the tires, especially, if the valve stems be long enough to pass through thick felloes, and consequently leave but little space between their outer ends and the wheel hub.

Numerous expedients have been tried to overcome the difficulties above referred to, but so far as I am aware none of these devices has met with practical success.

With the above difficulties and objections in mind, it has been my object to provide practical means for overcoming them.

A further object of my invention is to provide a valve stem so constructed that when the tire is in position the valve is readily accessible for attachment of a hose thereto to inflate the tire.

A still further object of my invention is to provide a valve stem of such a form and a rim of such construction to be used in connection with said valve stem, that the tire may be slid on and off the wheel transversely without resorting to a circumferential movement of the tire on the rim, thereby facilitating the manipulation of such tires, especially those used on truck wheels, which are large and of great weight.

An important feature of my invention resides, furthermore, in the fact that with the construction herein disclosed, it is possible to use with facility a tire and inner tube of greater size than that which the rim was originally designed to accommodate.

In the drawings, wherein I have illustrated a preferred embodiment of my invention:

Figure 1 is a transverse section through the wheel felloe and rim base showing the valve stem in elevation and a partial section of the tire;

Figure 2 is a partial section taken on the line 2—2 of Figure 1;

Figure 3 is a plan of a portion of the rim base showing the valve stem receiving recess or depression;

Figure 4 is a section on the line 4—4 of Figure 3 of the rim base, showing the recess or depression, with the valve stem omitted therefrom;

Fig. 5 is a fragmentary view showing a portion of the rim base in edge elevation;

Figure 6 is a transverse section showing my invention used with a form of demountable rim;

Figure 7 is a section taken on the line 7—7 of Figure 6; and

Figures 8 and 9 are detail views showing the ends of a split ring, and a section thereof, respectively.

In the drawings the numeral 10 designates the felloe of a wheel on which a tire 11 is mounted. A rim base 12, which, in this modification, is in the nature of a felloe band, and has an inner diameter the same as that of the outside of the wheel felloe 10, is shrunk on the latter and is provided with an outturned integral rib or flange 13. A removable ring or annulus 14 is fitted over the rim base 12, and is of the requisite size and so conformed, to fit snugly and smoothly against the rib 13, the inner surface of the ring being rounded and of a shape to receive the outer surface of the tire shoe or casing 15. The edge of the rim base 12, opposite to that provided with the integral rib 13, has a groove 16 on the outer surface, into which is fitted a removable split ring 17, corresponding in function to the rib 13, in that it provides a ledge for holding in place a ring 18 identical with the ring 14, and shaped and arranged to act as a seat for the other side wall of the tire casing 15. The split ring 17 is provided at one end with an inwardly turned lug 17ª, and is of such resiliency that it can be slightly sprung apart in removing and setting in place, but upon its release will spring back into normal substantially circular shape again. The inwardly turned lug 17ª is fitted into an aperture 19 in the rim base, and is thus held in the groove 16. The other end of the ring 17 is cut away on its inner periphery, as at 17ᶜ, to receive a tool for removing the ring, as shown in Fig. 8. The resiliency of the ring is sufficient to hold it in place in the groove 16, with the ends slightly spaced apart.

The side of the rim base which is provided with the groove 16 is of course arranged to come on the outside of the wheel so that it is readily accessible for mounting and demounting the tire.

At a point on the periphery of the rim base, a transverse depression or channel 20 is formed, extending inwardly to a point about midway the width of the rim, and the inner protuberance formed by the depression is fitted into a corresponding depression 21 in the wheel felloe when the former is shrunk on the latter. The metal of the rim base is cut away at 22 as is also the wheel felloe so as to leave a free path from the outside, to a point 23 in the depression.

The tire 11, here shown, is of the so-called "straight side" type, and provided with the usual beads 24, though it will be understood that a tire of the so-called "clincher" type might be used with equal advantage, if desired, it being only necessary to use rings 14 and 18 of appropriate conformation. The tire 11 has an inner tube 25, which is provided, with a valve 26, the stem 27 of which is secured in place by opposed screw disks 28 which clamp the material of the tube between them. This valve stem 27 passes through the usual flap 29 and is bent on an arc at 30 so that the portion 31 is at right angles to the tube engaging portion 32, thus being substantially elbow-shaped. The stem is also preferably again bent approximately at right angles at the point 33, where it reaches the edge of the rim, and the portion 34 is turned toward the centre of the wheel, and has the valve proper 35 at the end thereof, the latter being provided with the usual valve cap 36.

The several elements are assembled in the following manner and order on the wheel 10 with its felloe band or rim base 12 shrunk thereon, the ring 14 slipped on and moved toward the inner edge until it is contiguous the rib 13. The tire 11 is then mounted on the rim base, it being merely necessary to bring the valve stem 27 opposite the depression 20 and slide or push the tire on transversely until it contacts with the ring 14. The second ring 18 is then put in place on the rim base, and the split spring ring 17 inserted in the groove 16, by placing its lug 17ª in the receiving aperture and slightly springing the ring until it can be set in place, when the side is released and the ends spring toward each other and hold the ring in place. The tire is then inflated and is ready for use.

In demounting the tire the reverse operations are performed as will be obvious, the tire being first deflated.

If it is desired to use an over-size tire and tube on the rim, this may be readily done, for although the portion 31 of the valve stem 27 is longer for a larger size tire and tube, yet when used with a rim of less width, the portion 34 will merely extend out somewhat farther than it would in case a tire of correct size were used, since the space between the felloe 10 and the ring 16—provided by the cut away portion 22—is sufficient to permit this. I have shown in dotted lines in Fig. 1, the position that the portion 34 of the valve stem would occupy were an oversized tire used.

In Figs. 6 and 7 I have shown my invention applied to a rim of the so-called "demountable" type.

The wheel felloe 50 is provided with the usual felloe band 51, which has an inclined face 52 which is adapted for engagement by a similar face 53 of a demountable rim 54, the latter being held against the face 52 by means of a wedge shaped ring 55 shown in dotted lines Fig. 6, which is forced against the felloe band 51 and against the rim 54, and thus drives the rim 54 to its limit of movement against the face 52. The wedge ring is clamped in place by several clamps 55ª arranged at intervals around the periphery of the wheel, and forced in place by clamps 55ª and bolts 56 passing through the felloe and having nuts 56ª screwed against the clamps.

The rim 54 is provided with a flange 57 analogous in function to the ring 14 in Fig. 1, that is to say, it serves as a retaining means for the tire 11. A ring 58, held in place by a split ring 59, is arranged to support the other side of the tire 11, the parts being similar in every respect to the corresponding ring 18 and split ring 17 respectively. Blocks 60 are secured to the felloe band and in cooperation with filler elements 61 hold the rim from circumferential movement.

The demountable rim is provided with a transverse depression or channel 20ª which extends about halfway across the width of the rim and is freely open at its outer end. This depression 20ª like the depression 20, is for the purpose of receiving a valve stem 27ª, mounted in the inner tube 25ª, as set forth in the description of Fig. 1, above. The stem 27ª is twice bent at right angles and its outer end 34ª, which is turned inwardly toward the centre of the wheel, is provided with a valve 35ª and cap 36ª.

The manner of mounting and demounting the tire from the demountable rim is similar to that described above in connection with Fig. 1, but when the invention is used with a demountable rim, such demountable rim may be carried on the vehicle with an inflated tire thereon, so that it is only necessary, in case of a puncture to replace the rim with the punctured tire by the one bearing the inflated tire.

From the above description it will be apparent that my invention comprehends a structure of wheel rim and cooperating valve stem that enables an operator to manipulate even heavy truck tires with marked facility so that their mounting and demounting involves practically no more difficulty or exertion than the mounting and demounting of passenger automobile tires.

While I have illustrated two modifications of my invention it will be understood that changes may be made that fall within the scope of the appended claims, such, for example, as replacing the wheel with a wooden felloe shown in Fig. 1, by a steel wheel, without in any way departing from the essence of the invention.

What I claim is:

1. The combination with a wheel felloe, of a tire-retaining rim provided with a transversely disposed depressed portion forming a channel of substantially uniform depth adapted to receive the valve stem of a tire.

2. The combination with a wheel felloe, of a tire-retaining rim constructed to overhang the felloe at one edge thereof and provided with a transversely disposed channel extending inwardly from said edge of the felloe to receive the valve stem of the tire, the overhanging portion of the rim being slotted in alignment with the channel whereby the stem may be withdrawn from the channel in a lateral direction.

3. The combination with a wheel felloe, of a tire-retaining rim provided with an annular edge groove and a transversely disposed channel adapted to receive the valve stem of a tire, said channel terminating in a slot intercepting said groove whereby the stem may be withdrawn from the channel in a lateral direction, and a split tire-retaining ring adapted to seat is said groove.

4. The combination with a wheel felloe of a tire-retaining rim provided with an annular edge groove and a transversely disposed channel adapted to receive the valve stem of a tire, said channel being open at the grooved side of the rim, and a split tire-retaining ring adapted to seat in said groove.

5. The combination with a wheel felloe of a tire-retaining rim provided with an annular edge groove and a transversely disposed depressed portion adapted to form a horizontal channel opening upon the grooved side of the rim to receive the valve stem of a tire, a split resilient tire-retaining ring adapted to seat in the groove, and devices for locking the ring in the groove against turning movement therein.

6. In a device of the character described, a wheel rim for use with pneumatic tires, said rim having an outwardly turned rib at one edge thereof, and having a circumferential groove at the other edge thereof, and a depressed channel extending transversely thereof, and open at one end, said channel being adapted to receive the valve stem of the tire used in connection with said rim, whereby the tire may be slid upon said rim by a transverse motion alone.

7. In combination with a wheel, a rim therefor, a pneumatic tire on said rim, said rim being provided with a transverse depressed portion which is unobstructed at one end, a valve on said tire, a rigid stem for said valve, so bent that a portion thereof lies transversely of said tire base, and within said depressed portion, an integral rib on one edge of said rim and a groove on the other edge, a removable ring contiguous with said rib and against which said tire bears, a second ring bearing against the other side of said tire and a removable extensible ring mounted in said groove, whereby all the parts are maintained in position.

8. The combination with a wheel having a felloe, of a tire supporting rim having a depressed portion whereby a channel is formed, said channel extending partly across the face of the rim, a filler block upon the inner periphery of the rim and partly surrounding said depressed portion, and spaced lugs upon the felloe for engaging the filler block to lock the rim and felloe against relative circumferential movement.

9. The combination with a wheel felloe, of a tire retaining rim provided with a transversely disposed depressed portion adapted to receive the valve stem of a tire, said felloe comprising an abutment adapted to prevent circumferential movement of the rim relative to the felloe.

10. In combination with a wheel, a demountable rim therefor, provided with a transverse depression on its outer surface, rings mounted on said rim at the edges thereof, a pneumatic tire on said rim, said tire being held in place by said rings, a valve and valve stem connected to said tire, said valve stem lying within said depression when the tire is in position, whereby said tire can be transversely removed from said rim, after removal of one of said rings.

11. In combination with a wheel, a demountable rim therefor, having a transverse channel extending from one edge of said rim to a point substantially midway of the width of said rim, said channel being closed at one end and freely open at the other, rings on said rim, one of said rings being detachable, a pneumatic tire on said rim and held in place by said rings, a valve for said tire, an elbow-shaped valve stem for said valve, a portion of said valve stem lying within said channel when the tire is in position, whereby on detachment of said detachable ring, said tire can be removed from said rim by movement in a transverse direction only.

12. A demountable wheel rim for use with pneumatic tires, said rim having a depressed channel extending from the outside transversely across the outer surface of said rim, said channel being freely open at one end.

In witness whereof, I have hereunto signed my name in the presence of two subscribing witnesses.

JAMES E. HALE.

Witnesses:
E. C. LEADENHAM,
C. A. STRAW, Jr.